(12) United States Patent
Lewarchik et al.

(10) Patent No.: US 8,003,013 B2
(45) Date of Patent: Aug. 23, 2011

(54) WATERBORNE CORROSION-RESISTANT COATING

(75) Inventors: Ronald J. Lewarchik, Brighton, MI (US); Scott Rier, Pinckney, MI (US)

(73) Assignee: Martinrea Industries, Inc., Manchester, MI (US)

( * ) Notice: Subject to any disclaimer, the term of this patent is extended or adjusted under 35 U.S.C. 154(b) by 185 days.

(21) Appl. No.: 12/233,103

(22) Filed: Sep. 18, 2008

(65) Prior Publication Data

US 2009/0072199 A1   Mar. 19, 2009

Related U.S. Application Data

(60) Provisional application No. 60/973,244, filed on Sep. 18, 2007.

(51) Int. Cl.
- C09K 3/00 (2006.01)
- C23F 11/00 (2006.01)
- B60C 1/00 (2006.01)
- C08K 5/06 (2006.01)
- C08F 283/00 (2006.01)
- C08G 59/14 (2006.01)
- C08L 63/00 (2006.01)

(52) U.S. Cl. ........... 252/396; 252/387; 252/389.2; 524/372; 525/525

(58) Field of Classification Search .......... 252/396, 252/387, 389.2; 524/372; 525/525
See application file for complete search history.

(56) References Cited

U.S. PATENT DOCUMENTS

| | | | |
|---|---|---|---|
| 4,122,055 A | 10/1978 | Tugukuni et al. | |
| 4,596,744 A | 6/1986 | Anderson et al. | |
| 4,891,394 A | 1/1990 | Savin | |
| 4,981,729 A | 1/1991 | Zaleski | |
| 5,001,173 A * | 3/1991 | Anderson et al. | 523/406 |
| 5,141,815 A * | 8/1992 | Rickett | 428/418 |
| 5,248,331 A | 9/1993 | Sanford et al. | |
| 5,266,611 A * | 11/1993 | Teschendorf | 523/416 |
| 5,338,347 A | 8/1994 | Rohr et al. | |
| 5,418,264 A | 5/1995 | Obloh et al. | |
| 5,461,090 A | 10/1995 | Sweet | |
| 5,569,685 A | 10/1996 | Schreiber et al. | |
| 5,624,978 A | 4/1997 | Soltwedel et al. | |
| 5,804,615 A | 9/1998 | Schreiber et al. | |
| 6,168,865 B1 * | 1/2001 | Koster et al. | 428/418 |
| 6,235,812 B1 | 5/2001 | Reuter et al. | |
| 6,713,551 B2 * | 3/2004 | Takahashi et al. | 524/500 |
| 7,008,998 B2 | 3/2006 | Tazzia et al. | |
| 2004/0244875 A1 * | 12/2004 | Yasuda et al. | 148/247 |
| 2005/0227083 A1 * | 10/2005 | Farha | 428/413 |

FOREIGN PATENT DOCUMENTS

JP    2005194621   *   7/2005

* cited by examiner

*Primary Examiner* — Lorna M Douyon
*Assistant Examiner* — Tanisha Diggs
(74) *Attorney, Agent, or Firm* — Gifford, Krass, Sprinkle, Anderson & Citkowski, P.C.

(57) ABSTRACT

A waterborne thermoset cured anticorrosion formulation includes a water dispersed or emulsified phosphonated or water dispersed or emulsified sulfonated epoxy resin that is cured with a phenoxy resin having a polyhydroxyl ether backbone and terminal alpha glycol moieties. Water is present as a predominant volatile in which the epoxy resin and phenoxy resin are present in a weight ratio of epoxy resin to phenoxy resin of between 0.1 and 3:1. An aqueous curative is provided to induce cure between the epoxy resin and phenoxy resin, A corrosion inhibiting metal salt is also present having a salt anion of phosphate, biphosphate or tetraborate and a metal cation with the proviso that the metal cation formulation as a whole is devoid of chromium, lead, cobalt, and cadmium. Ideal curatives include aqueous aminoplast crosslinkers, aqueous unblocked isocyanates, aqueous blocked isocyanates, and a mixture thereof. With the inclusion of electrically conductive aluminum or zinc particulate the formulation is rendered corrosion resistant as well as electrically conductive to make an inventive coating amenable to powder coating.

12 Claims, No Drawings

WATERBORNE CORROSION-RESISTANT COATING

CROSS-REFERENCE TO RELATED APPLICATIONS

This application claims priority of United States Provisional Patent Application Ser. No. 60/973,244 filed Sep. 18, 2007, which is incorporated herein by reference.

FIELD OF THE INVENTION

The present invention in general relates to a thermoset curable aqueous dispersion and in particular to a cured thermoset coating formed therefrom that serves as a corrosion-resistant barrier.

BACKGROUND OF THE INVENTION

As volatile organic compounds (VOCs) become more strictly regulated in their usage, there is an ever-growing desire to provide polymeric coatings that are water based. Representative of the usage of aqueous coating dispersions is the automotive coating industry. While aqueous dispersions have several advantages relative to traditional organic solvent based dispersions such as reduction of VOC emission, reduced toxicity, lowered disposal cost, and reduced flammability, aqueous coating dispersions often suffer from low prepolymer loading in water owing to polymer immiscibility thereby complicating formulation process, cure kinetics, and application technique. Aqueous-based latex paints are exemplary of a film that fails to inhibit corrosion as containing microscopic pinholes and lacking components to suppress corrosion once initiated. In order to address prepolymer dispersibility limitations, the prepolymer is invariably derivatized to increase dispersibility in an aqueous solution. However, increasing water dispersibility of a prepolymer invariably leads to a cured coating that is more readily wet by water and often has diminished corrosion resistance. It is often desirous to make a coating electrically conductive so as to facilitate electrostatic discharge, electroplating, powder coating, or other electrostatic overlayer adhesion and application processes. While electro-coating techniques are favored for using limited or no VOCs, as well as a diminished overspray waste, the demands of requiring an aqueous dispersion of thermoset precursors to form an electrically conductive coating further complicates formulation and inevitably requires compromised corrosion resistance, handling properties, and/or dispersibility.

Curable electroconductive coatings have commonly employed a primer coating responsible for imparting corrosion resistance to the underlying substrate. Electrostatic coating generally provides improved corrosion resistance relative to spray or bath coating in providing a uniform deposition that does not suffer from coating material failing to contact recesses and complex three-dimensional substrates. A limitation associated with many conventional electrodeposition coatings is the usage of heavy metal corrosion-inhibitive pigments such as lead or chrome. The use of heavy metal corrosion-inhibitive pigments while beneficial in improving corrosion resistance of the underlying substrate create recycling and disposal problems as toxic metal particulate and aqueous leachant from such materials represent both environmental and health hazards.

Thus, there exists a need for a waterborne corrosion-resistant coating that overcomes limitations associated with conventional coatings and instead provides adhesion to a variety of substrates and tolerance to hydrocarbon fuel. There also exists a need for such a coating that can be rendered conductive and therefore useful in electrostatic charge dissipation and coating deposition and does so devoid of regulated toxic metals of lead, cobalt, cadmium, and chromium.

SUMMARY OF THE INVENTION

A waterborne thermoset cured anticorrosion formulation includes a water dispersed or emulsified phosphonated epoxy resin, or water dispersed or emulsified sulfonated epoxy resin that is co-cured with a phenoxy resin having a polyhydroxyl ether backbone and terminal alpha glycol moieties. Water is present as a predominant volatile in which the epoxy resin and phenoxy resin are present in a weight ratio of epoxy resin to phenoxy resin of between 0.1 and 3:1. A curative is provided to induce cure with the epoxy resin and phenoxy resin. A corrosion inhibiting metal salt is also present having a salt anion of phosphate, biphosphate or tetraborate and a metal cation with the proviso that the metal cation, and formulation as a whole are devoid of chromium, lead, cobalt, and cadmium. One part formulation curatives include aqueous aminoplast crosslinkers, aqueous blocked isocyanates, and a mixture thereof. With the inclusion of electrically conductive aluminum or zinc particulate the formulation is rendered more corrosion resistant as well as electrically conductive so as to make an inventive coating amenable to electrostatic discharge or top coating with a liquid or powder coating.

An article is provided that includes a substrate having a coating thereon. The coating is formed of cross-linked phosphonate- or sulfonate-terminated epoxy resin and phenoxy resin cured by an aminoplast crosslinker, an isocyanate functional curative or blocked isocyanate curative. A variety of conventional substrates are protected from corrosion through the addition of such a coating. The coating is rendered electrically conductive through the inclusion of conductive particulate.

DETAILED DESCRIPTION OF THE PREFERRED EMBODIMENTS

The present invention has utility in forming a corrosion-resistant coating for a variety of substrates illustratively including cold-rolled steel, nickel and/or zinc coated steel, stainless steel, aluminum. Furthermore, the present invention also has utility as a coating for impact-resistant polymers such as polycarbonate or acetonitrile butadiene styrene (ABS). An inventive coating formulation is readily prepared containing an emulsifiable phosphate ester- or sulfonate-terminated epoxy resin, and a phenoxy resin having a polyhydroxy ether backbone and terminal alpha glycol moieties, Both the epoxy and the phenoxy resins are dispersed in water at a weight ratio of epoxy resin:phenoxy resin of between 0.1-3:1. Preferably, handling properties of a dip coating formulation are enhanced when a total amount of epoxy resin and phenoxy resin in an inventive formulation exclusive of water is between 10 and 60 total weight percent. An aminoplast, diisocyanate, polyisocyanate, or combination thereof is provided to induce resin cross linking and formulation cure to provide a cured film. With resort to an encapsulated curative produced as detailed in the procedures detailed in U.S. Pat. No. 3,860,565; col. 8, line 46-col. 9, line 27 or likewise with resort to a blocked isocyanate curative, a stable one-part formulation is obtained that is thermally cured. Alternatively, if an ambient cured or low bake temperature coating is desired a part A includes the curable epoxy resin and the phenoxy resin and lacks a curative and a part B is provided containing the curative and is devoid of the curable resins. The inventive formulation contains sulfonate terminated epoxy resin, phosphate terminated epoxy resin, or a combination thereof. The inventive formulation (synonymously referred to as combined parts A and B, or total formulation) is devoid of toxic metal pigment particulate. Nontoxic metal conductive particulate of aluminum or zinc is provided to yield a conductive water based corrosion-resistant coating rendering a substrate having such a coating well suited for subsequent powder coating. The inventive formulation is able to form acceptable corrosion-resistant coatings without resort to majority organic solvents or toxic metal pigments that characterized prior art formulations. Such inventive formulations are also optionally produced without organo-tin catalysts. An inventive formulation is considered devoid of toxic metals to an extent that the toxic metal loading is below existing United States EPA limits.

An inventive aqueous borne coating is particularly useful for depositing corrosion-resistant coatings directly on various metals such as clean steel, galvanized metal, nickel tin coated steel, aluminized metal and polymeric substrates. An inventive formulation is also well suited for spray application onto a substrate. An inventive formulation when loaded with electrically conductive metallic particulate that can function as a sacrificial galvanic electrode, confers considerable corrosion resistance to a substrate so coated especially when a coating formed from the inventive formulation is overlaid with a topcoat such as a powder coating layer. It is appreciated that while other conductive materials such as carbon particulate or metalized mica are suitable to impart conductivity, such materials do not afford appreciable corrosion resistance.

The organic resin component of an aqueous formulation according to the present invention includes a water-dispersible or emulsifiable phosphate terminated epoxy resin or sulfate terminated epoxy resin in combination with a phenoxy resin characterized by a polyhydroxy ether backbone and terminal alpha glycol moieties represented by Formula I:

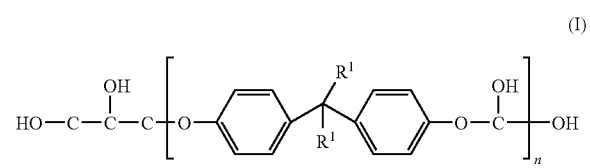

(I)

where $R^1$ in each occurrence is independently hydrogen, $C_1$-$C_6$; and n is an integer value of 20 to 1,000.

The epoxy resin component typically has a molecular weight of between 400 and 10,000 corresponding to an epoxide equivalent weight of from 100 to 5,000. An epoxide resin used in an inventive formulation is present as a colloidal dispersion in water having an average colloidal particle size of between 0.01 and 500 microns as measured by small angle x-ray scattering.

The phosphate- or sulfonate-terminated epoxy resins disperse in water, or a mixture of water and organic solvent, and are present as ether or ester derivatives. It is appreciated that epoxy resins, owing to a considerable lipophilic character, are difficult to form stable dispersions in water. Resort to phosphate or sulfonate moieties to impart a degree of hydrophilicity to the epoxy resin that is superior to other such epoxy resins. It is appreciated that introduction of a surfactant facilitates aqueous dispersion of epoxy resins as well as the phenoxy resins of an inventive formulation. Preferably, inventive formulation surfactants are nonionic or cationic. These surfactants inhibit the corrosion coating permeation associated with anionic surfactants. Nonionic surfactants are most preferred.

The other water-dispersible or emulsifiable ether or ester epoxy resins operative in the present invention include a variety of conventional epoxy resins, defined herein as reaction products of the condensation reaction of an epichlorohydrin and a hydroxy-containing compound or carboxylic acid. It is appreciated that the dispersion properties of these ether or ester resins are inferior to phosphate- or sulfonate-terminated epoxy resins and as such are preferably phosphated or sulfonated prior to formulation.

Examples of other water-dispersible or emulsifiable ester-type epoxy resins include polyglycidyl esters obtainable by reaction of a compound containing two or more carboxylic acid groups per molecule with epclilorohydrin or glycerol dichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Other water-dispersible or emulsifiable ether-type epoxy resins are obtained by reaction of a compound containing at least two free alcoholic hydroxyl and/or phenolic hydroxyl groups per molecule with an epichlorohydrin under alkaline conditions, or in the alternative, in the presence of an acidic catalyst with subsequent treatment with an alkali. The products of such reactions instead of being single simple compounds are generally complex mixtures of glycidyl polyethers. These ethers may be made from acyclic alcohols such as ethylene glycol, diethylene glycol, and higher poly(oxyethylene) glycols, propane-1,2-diol and poly(oxypropylene) glycols, propane-1,3-diol, poly(oxytetramethylene) glycols, pentane-1,5-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, and 2,2-bis(4-hydroxycyclohexyl) propane, and from alcohols having aromatic nuclei, such as N,N-bis(2-hydroxyethyl)aniline and p,p'bis(2-hydroxyethylamino) diphenylmethane. Or they may be made from mononuclear phenols, such as resorcinol and hydroquinone, and from polynuclear phenols, such as bis(4-hydroxyphenyl) methane (otherwise known as bisphenol F), 4,4'-dihydroxydiphenyl, bis(4-hydroxyphenyl) sulphone, 1,1,2,2-tetrakis(4-hydroxyphenyl)ethane, 2,2-bis(4-hydroxyphenyl)propane, (otherwise known as bisphenol A), 2,2-bis(3,5-dibromo-4-hydroxyphenyl)propane, and novolacs formed from aldehydes such as formaldehyde, acetaldehyde, chloral, and furfuraldehyde, with phenol itself and phenol substituted in the ring by chlorine atoms or by alkyl groups each containing up to 9 carbon atoms, such as 4-chlorophenol, 2-methylphenol, and 4-tert-butylphenol.

The epoxy resins have either a mixed aliphatic aromatic or an exclusively non-benzenoid (i.e., aliphatic or cycloaliphatic) molecular structure. The mixed aliphatic-aromatic epoxy resins generally are prepared by the well-known reaction of a bis-(hydroxy-aromatic) alkane or a tetrakis-(hydroxy-aromatic) alkane with a halogen-substituted aliphatic epoxide in the presence of a base such as, for example, sodium hydroxide or potassium hydroxide.

In one preferred embodiment, the epoxy resins are diglycidyl ethers of bisphenols, especially bisphenol A. These are made by reacting epichlorohydrin with bisphenol A in the presence of an alkaline catalyst. By controlling the operating conditions and varying the ratio of epichlorohydrin to bisphenol A, products of different molecular weight can be made. Subsequent reaction to form phosphate ester or sulfonate ester terminated resins are most preferred as these moieties impart exceptional water dispersibility, especially in concert with a surfactant.

Other usable epoxy resins include the diglycidyl ethers of other bisphenol compounds such as bisphenol B, F, G and H; these are also amenable to reaction to incorporate phosphate ester or sulfonate esters. Epoxy resins of the type described above based on various bisphenols are available from a wide variety of commercial sources.

The epoxy resins operative herein have an epoxy equivalency greater than 1.0. By epoxy equivalence, reference is made to the average number of 1,2-epoxide groups contained in the average molecule of the glycidyl ether or ester. As a result of the method of preparing the glycidyl polyethers and polyesters, and since they are ordinarily mixtures of chemical compounds having somewhat different molecular weights, the epoxy equivalency of the products is not necessarily the integer 2.0. However, the equivalency is generally a value of between 1.0 and 2.0.

The organic resin component of the aqueous compositions of the present invention include mixtures of epoxy resins with water-dispersible or emulsifiable phenoxy resins which are effective for modifying the properties of the epoxy resins and/or the coatings which are deposited on a substrate from the aqueous compositions.

An inventive formulation contains water-dispersible or emulsifiable epoxy resin in a weight ratio to phenoxy resin of between 0.1-3:1. Preferably, the amount of epoxy resin and phenoxy resin amount to between 10 and 60 total weight percent of a fully mixed formulation with spray coating formulations having an application solids of about 30 weight percent while dip or doctor blade applied formulations range upwards of 35 total weight percent resin.

A curative for the epoxy resin and phenoxy resin in an inventive formulation is provided as a part B that is mixed with a part A containing the resins. The curative according to the present invention is an aqueous solution of an aminoplast crosslinker, unblocked or blocked isocyanate curative as are known to the art. Representative of aminoplast curatives are glycol urea, benzoguanine urea formaldehyde, and melamines such as hexamethyl melamine. Also operative herein are blocked isocyanate functional curatives which are illustratively those based on diisocyanates and polyisocyanates reactive with resin functionality. It is appreciated that the formulation is devoid of organo-tin catalyst compounds such as dibutyl tin dilaurate in instances when tin leachant is considered an environmental concern; such catalysts are known to speed cure. Catalyst loadings are typically less than 0.005 parts by weight per part by weight of phenoxy resin and preferably between 0.0001 and 0.002 parts by weight.

Blocked isocyanate curatives operative herein include functional polyurethane adducts. Diisocyanates and polyisocyanates are conventionally reacted with one or more suitable polyols in a stoichiometric ratio such that the resulting adduct has at least two isocyanate groups. Illustrative polyols include diols, triols and higher polymeric polyols, such as polyester polyols, polyether polyols and the like, with the higher polymeric polyols being preferred, and polyester polyols being most preferred.

Suitable polyisocyanates are polyisocyanates that can be aliphatic, cycloaliphatic, and/or aromatic polyisocyanates. Useful aliphatic polyisocyanates include polyisocyanates derived from aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediisocyanate and para-xylylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of $\alpha,\alpha,\alpha$,-tetramethyl xylene diisocyanate can be used. Polyisocyanates derived from aliphatic diisocyanates and polyisocyanates are preferred. Preferably, the polyisocyanate is a diisocyanate, of which isophorone diisocyanate is exemplary. It is appreciated that the amount of curative in an inventive formulation will depend on factors including desired rate of cure, the identity of the curative, and the temperature at which cure takes place.

An inventive anticorrosion formulation includes a corrosion inhibiting metal salt having an anion of phosphate, biphosphate, or tetraborate. The metal salt metal cation is largely immaterial with the proviso that the metal cation is not lead, chromium, cadmium, cobalt or other regulated toxic metals. Zinc represents a particularly preferred metal cation. The corrosion inhibiting metal salt is typically present from 0.005-0.1 parts per weight relative to parts per weight of phenoxy resin present in an inventive formulation, and preferably present from 0.013-0.01 parts per weight corrosion inhibiting metal salt per part per weight of phenoxy resin present in an inventive formulation. It is appreciated that the degree of cross linking is relevant in the selection of the corrosion inhibiting metal salt with a highly cross linked inventive coating, namely one having an iso cyanate to hydroxyl moiety ratio of greater than 1:1 tolerant of corrosion inhibiting metal salts with a variety of water solubilities whereas low cross-linking density in the resultant coating requires the corrosion inhibiting metal salt to be of varying solubility in water of no greater than that of zinc phosphate, else the resulting cured coating has a tendency to blister. In addition to zinc phosphate, other suitable corrosion inhibiting metal salts illustratively include: molybdate modified zinc phosphate, and barium metaborate. Typical corrosion inhibiting metal salts operative with highly cross-linked coatings have solubilities of less than 0.08 percent in water and preferably a solubility of about 0.005-0.04. Suitable zinc phosphates are sold under the brand name HALOX (Hammond Group, Hammond, Ind.).

An optionally conductive inventive formulation preferably contains between 0.1 and 0.3 parts per weight of a conductive particulate per part phenoxy resin so as to render the coating formed from an inventive formulation electrically conductive and amenable to receiving a powder prime coating upon cure. The conductive particulate content will depend on factors including particulate size, shape, and intrinsic conductivity of the conductivity. Conductive particulate is readily provided in globular, powder, and flake forms. Typically, the conductive particulate has an average maximal linear extent of between 0.1 and 50 microns. It is appreciated that the maximum linear extent of a spherical particle is the same in all three orthogonal axes of x-y-z. It is strongly preferred that an inventive formulation is devoid of toxic metal pigments of lead, cobalt, cadmium, and chromium and other HEP-189 materials that pose a hazard during manufacture and the potential to leak from an article containing an inventive coating upon disposal and environmental weathering. As such, electrically conductive particulate operative herein illustratively includes aluminum and zinc. Aluminum is most preferred as having both good electrical conductivity and galvanic sacrificial electrode anticorrosion properties. Zinc has poorer electrical conductivity and comparable galvanic sacrificial electrode anticorrosion properties relative to aluminum. As such higher zinc loadings to decrease interparticle separation are needed to produce a comparable coating relative to an aluminum loaded formulation. It is appreciated that aluminum or zinc particulate sized to have a minimal linear extent greater than a desired coating thickness will increase surface roughness of an inventive coating. Additionally, particulate extending from a cured coating exposed surface and simultaneously in contact with a protected substrate creates an intercalation path for water to penetrate to the substrate and promote corrosion. Preferably a particle has a maximal linear extent of less than 90 percent of an inventive cured coating thickness.

Besides water, the aqueous inventive formulation includes limited amounts of water miscible or emulsifiable solvents to promote emulsification such as hydrocarbons, alcohols, esters, glycol ethers, and ketones. Specific solvents that facilitate homogenous dispersion include solvents beyond the glycol ethers, alcohols, and polyols. It is appreciated that inclusion of a surfactant promotes surfactant properties of the epoxy resin facilitates wetting of metal and microsphere abrasion resistance additives. Specific solvents include isopropanol, monobutyl and monohexyl ethers of ethylene glycol, and propylene glycol phenyl ether, propylene glycol propyl ether, ethylene glycol butyl ether, ethyleneglycol dimethyl ether, dipropylene glycol methyl ether, or mixtures thereof. Such emulsification solvents are present at between 0.0001 and 0.01 parts per parts by weight of phenoxy resin.

A pigment dispersant is optionally provided to her enhance passivation of a substrate by a coating formed from an inventive formulation, A pigment dispersant is typically present up to 0.3 parts by weight per part by weight of phenoxy resin. Preferably, if a pigment dispersant is present, it is present at between 0.01 and 0.1 parts by weight per part by weight phenoxy resin. Conventional pigment dispersants are operative herein and illustratively include those characterized by their ability to wet out and disperse pigments such dispersants illustratively include sodium polyacrylates, polyacrylic acids as well as polymeric hyperdispersants. Such pigment dispersements are commercially available under the trade names TAMOL (Rolun and Haas, Philadelphia, Pa.), OP 400 (Eastman Chemical, Kingsport, Tenn.), and SOLSPERSE (Lubrizol, Cleveland, Ohio). It is appreciated that the pigment dispersant is selected for effectiveness in an aqueous system and as such hydrophilic pigment dispersants are selected from those detailed above.

In instances when an inventive coating requires a degree of surface and through hardness, an abrasion resistance additive is provided in an inventive formulation. Typically, an abrasion resistance additive improves toughness and is present in an amount of less than 1.2 parts by weight per part by weight of phenoxy resin and preferably between 0.2 and 0.6 parts by weight per part by weight phenoxy resin. It is appreciated that the quantity by weight of abrasion resistance additive is in large part dictated by the additive particle size and additive particle density. Preferably, the abrasion resistance additive particulate has a spherical or generally spherical shape. Representative abrasion resistance additives are ceramic microspheres, glass microspheres, hollow glass spheres, and barium sulfate particulate. It is appreciated that the abrasion resistance particulate is sized to have a diameter less than a desired coating thickness to maintain surface smoothness of a coating formed from an inventive formulation, Additionally, abrasion resistance particulate extending from a cured coating exposed surface and simultaneously in contact with a protected substrate transmits abrasive forces through the coating to the underlying substrate in a manner similar to that of metallic particulate and provides an intercalation path for water to penetrate to the substrate and promote corrosion. It is further appreciated that by control of abrasion resistant additive loadings, minimal impact on the flexibility of an inventive coating results. Typical abrasion resistance additive particle sizes range from 5 to 50 microns and preferably are between 5 and 15 microns. Optionally, abrasion resistance additives are surface metalized to provide an enhanced degree of conductivity.

Optionally, one or more pigments are provided in an inventive formulation and provide a desired coloration. Preferably, pigment is added that upon aqueous suspension provides a basic pH and preferably a pH of between 8.5 and 10.5. Without intending to be bound by a particular theory, it is believed that inclusion of a basic pigment dispersed throughout an inventive formulation improves corrosion resistance in a resultant coating. Representative of such a pigment is a calcium ion-exchanged amorphous silica. An added advantage of amorphous silica is the ability to absorb appreciable quantities of oil due to high surface area. Typical pigment sizes are from 0.1 to 20 microns and preferably between 1 and 10 microns. Typical loadings of basic pigment are up to 0.3 parts by weight per part by weight of phenoxy resin and preferably between 0.01 and 0.1 parts by weight per part by weight phenoxy resin. Preferably, a basic pigment functions synergistically with other pigments.

In addition to the above detailed components, an inventive formulation optionally contains limited quantities of substances to facilitate dispersion stability, resultant coating quality or application properties thereof. For instance, between 0 and 0.3 parts by weight per part by weight phenoxy resin of each of: an inventive formulation is a non-Hazardous Air Pollutant (non-HAP) solvent such as dibasic acid esters, glycerol esters, fatty acids, fatty acid esters, fatty acid amides, alkoxylated esters, fatty acid salts, and silicone oils; wetting agents commonly known in the art; defoamers such as a polysiloxane; antioxidants; biocides; ultraviolet light absorbers; and pop resistance additives such as acrylic resins. Preferable loading of each of these optional additives is between 0.0001 and 0.01 parts by weight per part by weight phenoxy resin.

An inventive formulation is particularly well suited for dip or spray application to a substrate, and an inventive coating is readily applied to a substrate through other conventional coating techniques such as dip coating. Additionally, in instances where electrically conductive coating is not required and as such the conductive particulate is not present in an inventive formulation, the inventive formulation is well suited for use as a primer, or top coat. After a substrate has been coated with an inventive formulation, the formulation is allowed to cure to a hardened coating. While various conditions of cure are operative herein inclusive of cure at ambient room temperature (20° Celsius) at atmospheric pressure, heat curing is preferred to facilitate volatilization of residual water, solvent, and cure byproducts such as methanol liberated in the course of a melamine cure. Preferred curing temperatures while varying on the specifics of the inventive formulation are typically between 60° and 2000 Celsius. While cure rate varies depending on the specifics of an inventive formulation and physical characteristics of formulation as applied, namely the thickness of the precured formulation, typical cure rates range from 5 to 60 minutes.

An inventive formulation is summarized with respect to Table 1. The high degree of epoxy resin suspension in water according to the present invention is critical in providing a suitable waterborne anticorrosion dip coating. It is appreciated that the nature of curative dictates whether an inventive formulation is a one part or two part formulation. With thermally activated encapsulated curatives or blocked isocyanate curatives a one part formulation with room temperature stability forms. Heating the formulation thereafter initiates cure.

TABLE 1

Operative and Preferred Compositions (in parts by weight unless otherwise stated)

| Component | Operative | Preferred |
|---|---|---|
| Phenoxy resin having a polyhydroxy ether backbone and terminal alpha glycol moieties | 1 | 1 |
| Water dispersed or emulsified phosphonated or sulfonated epoxy resin | 0.1-3 | 0.3-0.9 |
| Diisocyanates or polyisocyanates NCO/resin OH stoichiometric ratio of moieties | 0.6-2 | 1.1-1.7 |
| Aminoplast curative-NHR/resin OH stoichiometric ratio of moieties | 0-50 | 10-40 |
| Corrosion inhibiting metal salt | 0.005-0.1 | 0.013-0.01 |
| Amorphous silica (basic pigment) | 0-0.3 | 0.01-0.1 |
| Pigment dispersant | 0-0.3 | 0.01-0.1 |
| Al or Zn metal particulate | 0-0.6 | 0.1-0.3 |
| Abrasion resistance additive | 0-1.2 | 0.2-0.6 |
| Surfactant | 0-0.1 | 0.0001-0.001 |
| Misc. additives: Pop resistance additive, defoamer, solvent, biocide, UV stabilizer each @ | 0-0.3 | 0.0001-0.01 |
| Catalyst | 0-0.005 | 0.0001-0.002 |
| Water | balance to homogeneity | balance to homogeneity |

The present invention is further detailed with respect to the following nonlimiting examples. These examples are not intended to limit the scope of the appended claims.

EXAMPLE 1

In a mechanical mixer, 14.3 grams of an aluminum is combined with 30.2 grams of phosphonate ether terminated epoxy having an average molecular weight of 1,000, 6 grams of hexamethyl melaamine (Cymel 303), 1.5 grams zinc phosphate, 1 gram of nonionic surfactant (Surfynol 104BC), and 10 grams of isopropanol. Approximately 75 grams of deionized water is added to form a homogeneous the resultant part B dispersion containing 10.5 residual solid percent of aluminum particulate Part A including 50 residual solids percent of phenoxy resin having a viscosity at 25° Celsius of 1200-2800 centipoise at 38% solids as a colloidal dispersion having a pH of between 6.8 and 7.8, a colloidal dispersion average particle size of 0.11 microns and an acid number of 30. The part A also includes 10 residual solid percent of the phosphated epoxy resin having a phosphate functionality of 20.5 and an average molecular weight of 1,000. The part A is added to the part B containing hexamethyl melamine (Cymel 303) and water. The resultant inventive formulation cures to a tack-free corrosion-resistant conductive film.

EXAMPLE 2

The process of Example 1 is repeated with the epoxy resin phosphate ester constituting 20 residual solid weight percent to achieve a waterborne corrosion-resistant coating according to the present invention.

EXAMPLE 3

The process of Example 1 is repeated with the addition of blocked isocyanate cross linker that with heating to 190° Celsius for 60 minutes yields a waterborne corrosion-resistant coating according to the present invention.

EXAMPLE 4

A one part inventive formulation is produced by combining in a mechanical mixer a resin blend of 6000 grams of phenoxy resin, 3000 grams of phosphated epoxy resin detailed with respect to Example 1, 3500 grams of blocked polyisocyanate curative having an average isocyanate equivalent weight of about 300 grams/equivalent, with 1200 grams deionized water. The resultant resin blend is mechanically mixed with a paste including 80 grams of hexamethyl melamine, 250 grams of calcium ion exchanged amorphous silica, 140 grams of zinc phosphate, 50 grams of butoxyethyl acetate, 600 grams of pigments, 1200 grams of average linear extent of about 5 microns aluminum flake, 2700 grams of 12 micron ceramic microspheres, and 700 grams of deionized water. Upon homogenizing and degassing, the resultant formulation is dip applied and cured on 409 stainless steel coupons to a thickness of 30 microns by heating to 190° Celsius for 30 minutes. The resultant coating provides considerable corrosion resistance upon being subjected to a salt spray test by exposing the coupons to a salt fog for 360 hours with an aqueous solution of 5% sodium chloride maintained at a temperature of 410 Celsius according to ASTM B-117. Upon exposure to the salt fog, the coated coupons were devoid of blistering or discolorations associated with initial corrosion. 0% red rust is observed on the coupon edges. Repetition with Zn/Ni coupons yielded less than 1% edge red rust.

EXAMPLE 5

The coating of Example 1 is dip applied and cured on 409 stainless steel coupons to a thickness of 10 microns. The resultant article having an inventive coating of Example 1 on a substrate shows considerable corrosion resistance. The coated article is subjected to a salt spray test by exposing the coupons to a salt fog for 360 hours with an aqueous solution of 5% sodium chloride maintained at a temperature of 41° Celsius according to ASTM B-117. Upon exposure to the salt fog, the coated coupons were devoid of blistering or discolorations associated with initial corrosion. 0% red rust is observed on the coupon edges. Repetition with Zn/Ni coupons yielded less than 1% edge red rust.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A waterborne thermoset cure anticorrosion formulation comprising:
   a water-dispersed or emulsified phosphonated epoxy resin;
   a phenoxy resin having a polyhydroxy ether backbone and terminal alpha glycol moieties, wherein said phenoxy resin is

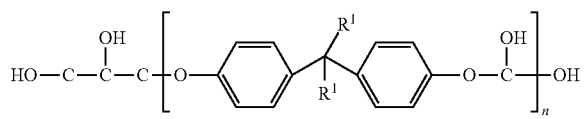

where $R^3$ in each occurrence is independently hydrogen or $C_1$-$C_6$; and n is an interger value of 20 to 1,000;

water as a predominant in which said epoxy resin and said phenoxy resin are present in a weight ratio of said epoxy resin:said phenoxy resin of between 0.1-3:1;

an aqueous curative; and a corrosion inhibitive pigment.

2. The formulation of claim 1 further comprising a corrosion inhibiting metal salt having a metal cation and an anion of phosphate, biphosphate or tetraborate with the proviso that the metal cation and the formulation are devoid of chromium, lead, cobalt and cadmium.

3. The formulation of claim 1 wherein said epoxy resin is a bisphenol A resin.

4. The formulation of claim 1 wherein said epoxy resin is the phosphate ester terminated epoxy resin and said curative is an aqueous aminoplast, an aqueous blocked isocyanate, or a combination thereof.

5. The formulation of claim 1 wherein the weight ratio of said epoxy resin:said phenoxy resin is between 0.3-0.9:1.

6. The formulation of claim 5 further comprising an electrically conductive particulate of aluminum or zinc.

7. The formulation of claim 2 wherein said corrosion inhibiting metal salt is a zinc phosphate.

8. The formulation of claim 6 further comprising an abrasion resistance additive of ceramic microspheres, glass microspheres or barium sulfate.

9. The formulation of claim 1 wherein said curative is an aqueous aminoplast and is a melamine.

10. The formulation of claim 1 wherein said curative comprises both an aqueous aminoplast and a blocked isocyanate.

11. The formulation of claim 8 further comprising a nonionic surfactant.

12. A waterborne thermoset cure anticorrosion formulation comprising:

a water-dispersed or emulsified phosphonated bisphenol A epoxy resin;

a phenoxy resin having a polyhydroxy ether backbone and terminal alpha glycol moieties; wherein said phenoxy resin is

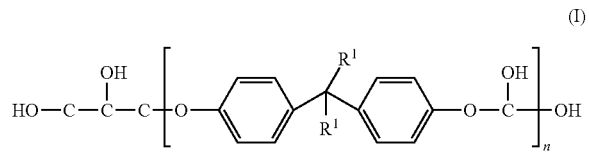

where $R^1$ in each occurrence is independently hydrogen or $C_1$-$C_6$; and n is an interger value of 20 to 1,000;

water as a predominant in which said epoxy resin and said phenoxy resin are present in a weight ratio of said epoxy resin:said phenoxy resin of between 0.1-3:1;

an aqueous curative that is an aqueous blocked isocyanate; and a corrosion inhibitive pigment.

* * * * *

UNITED STATES PATENT AND TRADEMARK OFFICE
CERTIFICATE OF CORRECTION

PATENT NO. : 8,003,013 B2
APPLICATION NO. : 12/233103
DATED : August 23, 2011
INVENTOR(S) : Ronald J. Lewarchik et al.

It is certified that error appears in the above-identified patent and that said Letters Patent is hereby corrected as shown below:

Title page, item (57): Abstract, line number 9, "phenoxy resin, A" should read --phenoxy resin. A--.

Column 2, line number 51, "glycol moieties," should read --glycol moieties.--.

Column 9, line number 46, "particulate Part A" should read --particulate. Part A--.

Column 10, line number 27, "410 Celsius" should read --41° Celsius--.

Column 11, line number 9, "where $R^3$ in" should read --where $R^1$ in--.

Signed and Sealed this
Seventh Day of February, 2012

David J. Kappos
*Director of the United States Patent and Trademark Office*